(12) United States Patent
Balbosa

(10) Patent No.: US 8,276,626 B2
(45) Date of Patent: Oct. 2, 2012

(54) SANITARY PROTECTIVE COVER FOR APPLIANCE HANDLE

(76) Inventor: Phyllis Balbosa, Belmont, NC (US)

(*) Notice: Subject to any disclaimer, the term of this patent is extended or adjusted under 35 U.S.C. 154(b) by 136 days.

(21) Appl. No.: 12/009,762

(22) Filed: Jan. 22, 2008

(65) Prior Publication Data
US 2008/0185083 A1 Aug. 7, 2008

Related U.S. Application Data

(60) Provisional application No. 60/885,704, filed on Jan. 19, 2007.

(51) Int. Cl.
*H02G 3/04* (2006.01)
(52) U.S. Cl. ........ 150/154; 150/155; 150/156; 150/157; 150/158; 16/422; 16/421; 16/435; 16/436; 280/33.992; D34/27; D6/610
(58) Field of Classification Search .................. 150/154, 150/158, 161
See application file for complete search history.

(56) References Cited

U.S. PATENT DOCUMENTS

| | | | |
|---|---|---|---|
| 1,876,993 A * | 9/1932 | Manning | 74/558 |
| 2,368,330 A * | 1/1945 | Schwartz | 404/41 |
| 3,313,333 A * | 4/1967 | Lordi | 220/666 |
| 3,866,649 A * | 2/1975 | Bringmann | 16/422 |
| 5,052,158 A * | 10/1991 | D'Luzansky | 52/177 |
| 5,215,319 A | 6/1993 | Farris | |
| 5,429,377 A * | 7/1995 | Duer | 280/33.992 |
| 5,820,142 A | 10/1998 | Duer | |
| D403,549 S * | 1/1999 | Dudash | D6/610 |
| D416,368 S * | 11/1999 | Brewer et al. | D34/27 |
| 6,065,764 A * | 5/2000 | Moseley | 280/33.992 |
| 6,543,794 B1 | 4/2003 | Tyree | |
| 6,761,563 B1 * | 7/2004 | Lin | 434/169 |
| 6,817,066 B1 * | 11/2004 | Williams et al. | 16/435 |
| 7,281,718 B2 * | 10/2007 | Malchow | 280/33.992 |
| 2004/0021279 A1 * | 2/2004 | Sobo et al. | 280/33.992 |
| 2005/0066479 A1 | 3/2005 | Kim et al. | |
| 2008/0303230 A1 * | 12/2008 | Somberg | 280/33.992 |
| 2009/0133789 A1 * | 5/2009 | Hall | 150/154 |

FOREIGN PATENT DOCUMENTS

CA 2409844 5/2004

* cited by examiner

*Primary Examiner* — Anthony Stashick
*Assistant Examiner* — Cynthia Collado
(74) *Attorney, Agent, or Firm* — James Ray & Assoc

(57) ABSTRACT

A sanitary shield for preventing direct contact of a user with an exterior surface of an elongated handle includes a flexible sheet having each of a predetermined width, a predetermined length and a predetermined thickness. The flexible sheet is formed from a flexible plastic material. A first row of interposed tabs and notches is formed in a first side edge of the flexible sheet and a second row of interposed tabs and notches is formed in a second side edge of the flexible sheet, whereby each tab in one row is aligned with a notch in an opposed row. The respectively aligned tabs and notched are interlocked with each other for firmly securing the flexible sheet onto the elongated handle, whereby the interlocking tabs and notches along with the first and second side edge lie within confines of the predetermined thickness of the flexible sheet. The sanitary cover may be also provided as a tubular member.

13 Claims, 3 Drawing Sheets

SANITARY PROTECTIVE COVER FOR APPLIANCE HANDLE

CROSS-REFERENCE TO RELATED APPLICATIONS

This application is related to and claims priority from Provisional Patent Application Ser. No. 60/885,704 filed on Jan. 19, 2007.

FIELD OF THE INVENTION

The present invention relates, in general, to sanitary covers and, more particularly, this invention relates to a sanitary protective cover for an elongated handle commonly used on shopping carts, appliances, shower doors and the like and, yet more particularly, the instant invention relates to a sanitary protective cover which can be securely retained on the elongated handle without the use of fasteners.

BACKGROUND OF THE INVENTION

As is generally well known, the handles of household appliances such as refrigerators, freezers, washers, and dryers, as well as handles of other types of frequently used household items such as shower doors and cabinet fronts tend to collect grease and dirt due to the consistent and repeated use. Accordingly, users spend a great deal of money and effort cleaning these handles in order to maintain their sanitary conditions and esthetic appearance.

It is further well known, that handles of hand-propelled shopping carts accumulate great degree of harmful bacteria posing potential danger to users as such bacteria is transferred from one user to another.

Prior to the design and conception of the present invention, efforts have been made, particularly in the art of shopping carts, to alleviate the problems of harmful bacteria transfer. U.S. Pat. No. 5,820,142 issued to Duer, U.S. Pat. No. 6,065,765 issued to Moseley, U.S. Pat. No. 6,543,794 issued to Tyree, U.S. Pat. No. 5,215,319 issued to Farris and Canadian Pat. No. 2,409,844 issued to Tompkins disclose various designs of the protective sanitary cover for elongated handles. However, these prior art devices are disadvantages either by lack of means to secure side edges of the sanitary cover to each other or by an overlapping condition of one edge over another, especially when various fastening means are employed. Furthermore, the presently employed fastening means such as hook and loop fasteners, snaps, buttons, adhesives and the like increase the cost of such sanitary covers.

Therefore, there is a need for an improved sanitary cover for an elongated handle which can be securely retained on such elongated handle by joining opposed longitudinal edges without the use of fasteners.

SUMMARY OF THE INVENTION

The present invention provides a sanitary cover for preventing direct contact with an exterior surface of an elongated handle. The cover includes a flexible sheet. The flexible sheet has each of a predetermined width, a predetermined length and a predetermined thickness. The flexible sheet is formed from a predetermined material. A gripping means is provided and has a first portion thereof formed in a first side edge of the flexible sheet. A second portion of the gripping means is formed in an opposed second side edge of the flexible sheet. The gripping means firmly secures the flexible sheet onto the elongated handle, whereby each of the gripping means and the first and second side edge lie within confines of the predetermined thickness of the flexible sheet.

The present invention also provides a sanitary cover for preventing direct contact with an exterior surface of an elongated handle. The sanitary cover includes a tubular member which has a hollow interior forming a peripheral wall of such tubular member. The tubular member further has each of a predetermined length, a predetermined diameter and a predetermined thickness of the peripheral wall. A longitudinal slit is formed though the peripheral wall. The longitudinal slit forms a first longitudinal edge and an opposed second longitudinal edge of the tubular member. The first and the second longitudinal edges are pulled apart for positioning the tubular member about the exterior surface of the elongated handle. A gripping means is provided and has a first portion thereof formed in a first longitudinal edge of the tubular member. A second portion of the gripping means is formed in an opposed longitudinal edge of the tubular member. The gripping means firmly secures the tubular member onto the elongated handle, whereby each of the gripping means and the first and second longitudinal edge lie within confines of the predetermined thickness of the tubular member.

OBJECTS OF THE INVENTION

It is, therefore, one of the primary objects of the present invention to provide a sanitary cover for an elongated handle employed on shopping carts, appliances, shower doors and the like devices.

Another object of the present invention is to provide a sanitary cover for an elongated handle that can be securely retained thereon by joining its longitudinal edges.

Yet another object of the present invention is to provide a sanitary cover for an elongated handle that can be securely retained thereon by joining its longitudinal edges without the use of fasteners.

A further object of the present invention is to provide a sanitary cover for an elongated handle that is simple to install.

Yet a further object of the present invention is to provide a sanitary cover for an elongated handle that is economical to manufacture.

An additional object of the present invention is to provide a sanitary cover for an elongated handle that can accommodate various handle diameters.

Another object of the present invention is to provide a sanitary cover for an elongated handle that can be customized by a user for esthetic purposes.

A further object of the present invention is to provide a sanitary cover for an elongated handle that can be easily cleaned.

Another object of the present invention is to provide a sanitary cover for an elongated handle that can be easily removed and reinstalled.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
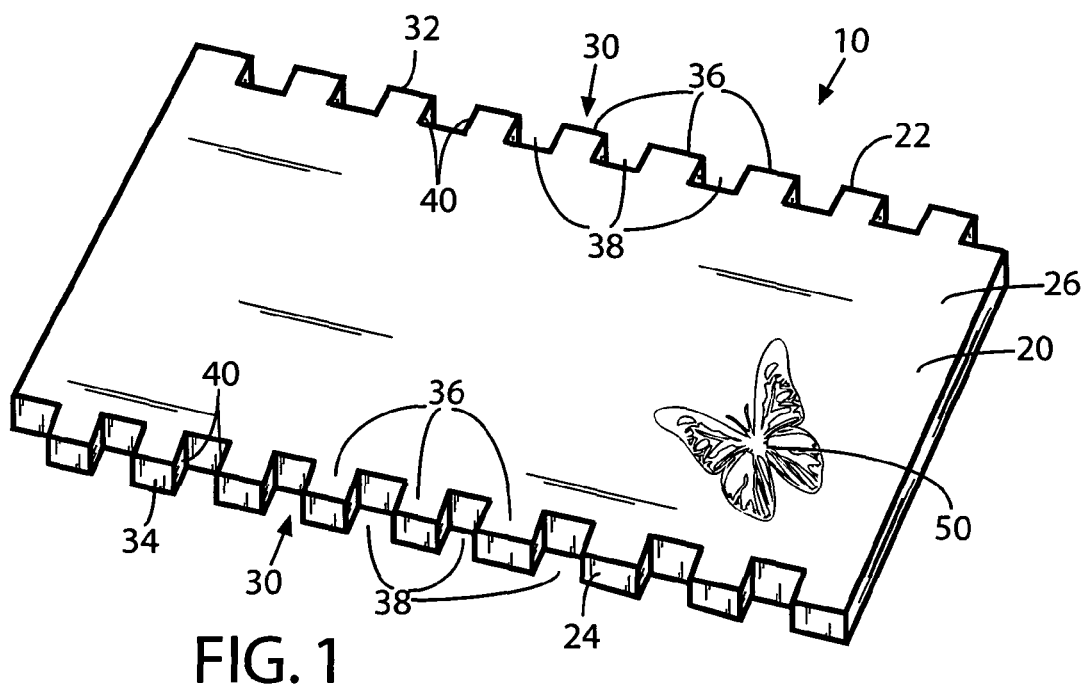
FIG. 1 is an isometric view of a sanitary cover which is constructed according to one embodiment of the present invention.
Figure 2:
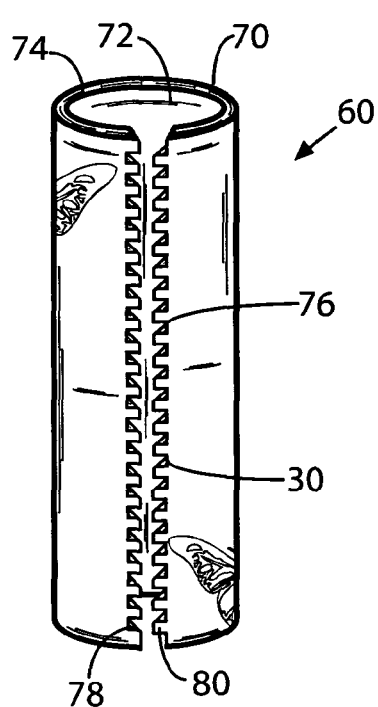
FIG. 2 is a rear isometric view of a sanitary cover which is constructed according to another embodiment of the present invention.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of an elongated handle includes but is not limited to elongated handles used on shopping carts, household appliances, shower doors, towel bars, cabinets and the like and having exterior surface thereof that is consistently and repeatedly contacted by the user.

The best mode for carrying out the invention is presented in terms of its presently preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

Reference is now made, to FIG. 1, wherein there is shown a sanitary cover, generally designated as 10, which is constructed according to one embodiment of the invention. The sanitary handle 10 is provided for preventing direct contact of a user with an exterior surface 4 of an elongated handle 2.

The sanitary cover 10 includes a flexible sheet 20 having each of a predetermined width, a predetermined length and a predetermined thickness. It will be appreciated that the length and width of the flexible sheet 20 will be predetermined based on a specific dimensions of the elongated handle 2. Preferably, the length of the flexible sheet 20 will cover the entire length of the elongated handle 2, although a partial coverage thereof is also contemplated within the present invention. The width of the flexible sheet 20 depends on the circumference of the handle 2 and whether or not the flexible sheet 20 is to snugly fitted about the exterior surface 4. The flexible sheet 20 is formed from a predetermined material. It is presently preferred for such material to be biologically impervious to harmful bacteria or any other infectious agent that can accumulate on the exterior surface 4 of the elongated handle 2. It is also presently preferred for such material to be washable as to sustain continuous use over prolong periods of time. For example only, such material may be a polyethylene chloride (PVC).

The flexible sheet 20 has a first elongated side edge 22 and an opposed second elongated side edge 24. In use, the first and second side edges, 22 and 24 respectively, are aligned with a longitudinal direction of the elongated handle 2.

There is also provided a gripping means, generally designated as 30, for firmly securing the flexible sheet 20 onto the elongated handle 2. The gripping means 30 has a first portion thereof formed in the first side edge 22 of the flexible sheet 20 and has a second portion thereof formed in the second side edge 24 of the flexible sheet 20. Importantly, each of the gripping means 30 and the first and second side edges, 22 and 24 respectively, lie within confines of the predetermined thickness of the flexible sheet 20.

It is presently preferred for the first portion of the gripping means 30 to include a first row 32 of spaced gripping members and wherein the second portion of the gripping means 30 includes a second row 34 of the spaced gripping members. The gripping members interlock therebetween within the confines of the predetermined thickness when the flexible sheet 20 is wrapped around the exterior surface 4 of the elongated handle 2 and when the first side edge 22 and the second side edge 24 are aligned with each other in a longitudinal direction of the elongated handle 2.

Further, each first row 32 and second row 34 includes an interposed plurality of tabs 36 and notches 38 which can be simply formed through the thickness of the flexible sheet 20, for example by a punching or die-cutting process, providing for cost effective manufacture of such sanitary cover 10. The tabs 36 and the notches 38 share common side edges 40. When such gripping means 30 is formed, each of the plurality of the tabs 36 formed in the first side edge 22 is aligned with a respective one of the plurality of notches 38 formed in the second side edge 24 when the first and second side edges, 22 and 24 respectively, are positioned in close proximity to each other. Likewise, each of the plurality of tabs 36 formed in the second side edge 24 is aligned with a respective one of the plurality of notches 38 formed in the first side edge 22. Although the tabs 36 and notches 38 have been shown in FIG. 1 as having a square shape, any shape will be equally suitable for use in the present invention.

It has been found that the predetermined thickness of the flexible sheet being about 0.12 inches is preferable for securely retaining the sanitary cover 10 on the elongated handle 2, although other thicknesses of the flexible sheet 20 can be employed.

Figure 3:
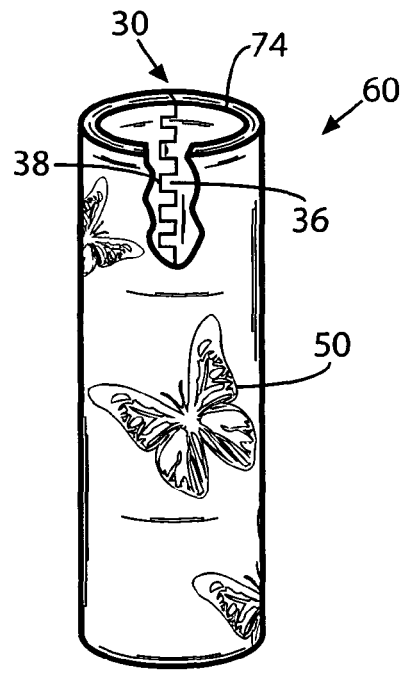
FIG. 3 is a front isometric view of the sanitary cover of FIG. 2, further illustrating gripping members being interlocked with each other.

Advantageously, die-cutting operation provides for generally equal width of the tab 36 and notch 38, so that aligned pairs of tabs 36 and notches 38 are interlocked therebetween for securely retaining the sanitary cover 10 on the elongated handle 2. The interlocked condition of the tabs 36 and notches 38 is best shown in FIG. 3. If required for accommodating elongated handles 2 of various diameters, a depth of each notch 38 is formed smaller than a height of the respective tab 36. Thus, the sanitary cover 10 can be securely retained on the elongated handle 2 while a longitudinal gap 28 is formed between the first and second side edges, 22 and 24 respectively when the sanitary cover 10 is secured on the elongated handle 2.

Figure 4:
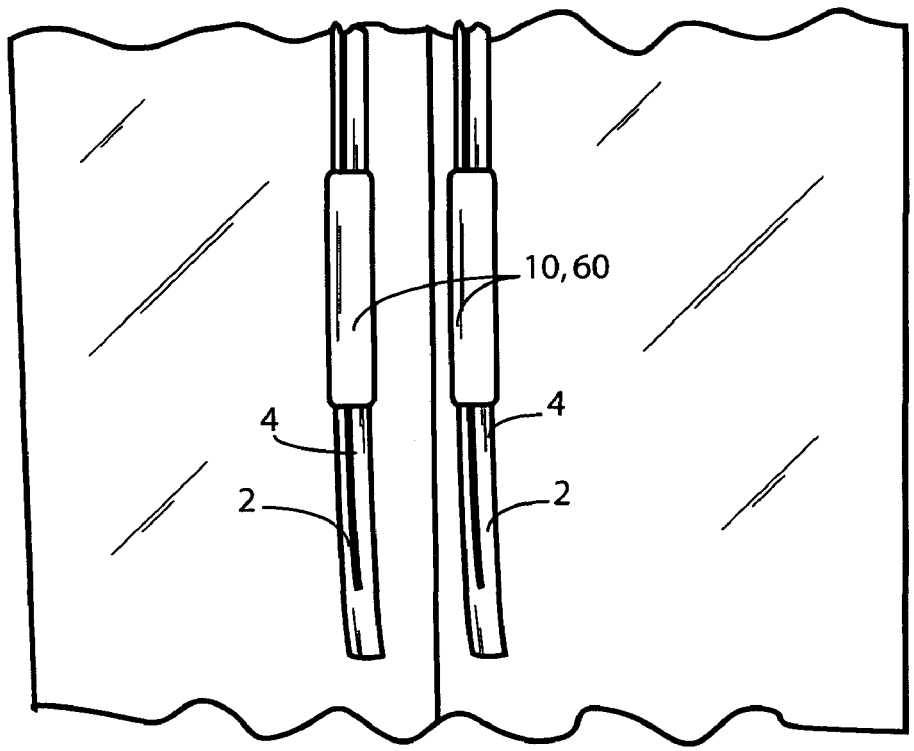
FIG. 4 is an environmental view illustrating the use of the sanitary cover of FIGS. 1-3 on an elongated handle of a conventional refrigerator.
Figure 5:
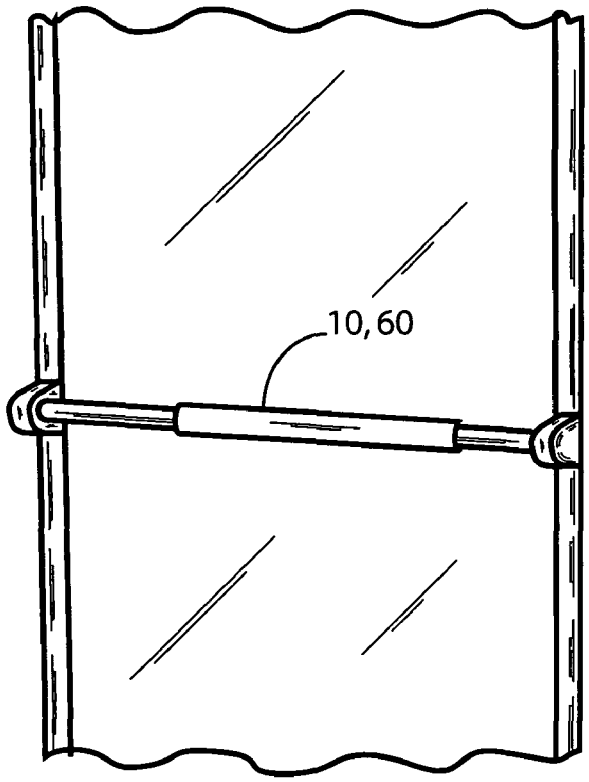
FIG. 5 is an environmental view illustrating the use of the sanitary cover of FIGS. 1-3 on an elongated handle of a conventional shower door.
Figure 6:
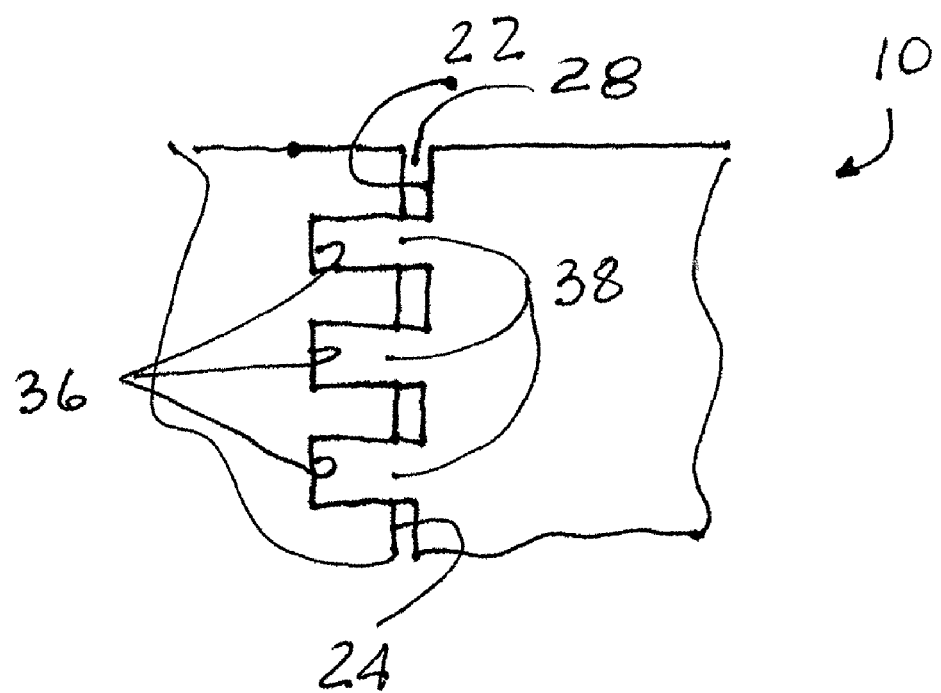
FIG. 6 a partial elevation view of the sanitary cover, particularly illustrating relationship between aligned tabs and notches.

In use, as best shown in FIGS. 4-5, the flexible sheet 20 is simply wrapped about the exterior surface 4 of the elongated handle 2, the side edges 22 and 24 are aligned with each other so that the user can simply press onto the tabs 36 to interlock them with aligned mating notches 38. Thus, the sanitary cover 10 can be securely retained on the elongated handle 2 without the use of fasteners which further reduces the manufacturing costs of the sanitary cover 10. The gripping means 30 may be oriented toward the rear of the handle in order to hide it from direct view.

When required, the flexible sheet 20 can be simply removed by disengaging the tabs 36 from the notches 38, for example by pulling on the first or second side edge, 32 or 34 respectively, and the sanitary cover 10 can be washed or cleaned and further enable cleaning of the elongated handle 2. Equally as simple, the sanitary cover 10 is reinstalled onto the elongated handle 2.

The present invention also contemplates to customize appearance of the sanitary cover 10 depending on the preference of the user. Accordingly, the flexible sheet 20 may be provided in various colors. Furthermore, predetermined indicia 50 may be securely disposed on an exterior surface 26 of the flexible sheet 20 being secured about the elongated handle 2. Such predetermined indicia may be at least one of a decal and a printing. Decals, particularly of the removable type held by electrostatic charge, may be advantageous for enabling the user to periodically change the appearance of the sanitary cover 10.

According to a second embodiment, the present invention provides a sanitary cover, generally designated as 60, for preventing direct contact with the exterior surface 4 of the elongated handle 2. Now in reference to FIGS. 2-3, such sanitary cover 60 includes a tubular member 70 which has a hollow interior 72 forming a peripheral wall 74. The tubular member 70 further has each of a predetermined length, a predetermined diameter and a predetermined thickness of the peripheral wall 74. A longitudinal slit 76 is formed though the peripheral wall 74 and provides a first longitudinal edge 78 and an opposed second longitudinal edge 80 of the tubular member 70. It will be apparent to those skilled in the art that the sanitary cover 60 will operate generally identical to the sanitary cover 10 of FIG. 1, except that it will be preformed in a tubular shape wherein the first and the second longitudinal edges, 78 and 80 respectively, are pulled apart for positioning the tubular member 10 about the exterior surface 4 of the elongated handle 2. Thus, the material of the tubular member 70 is flexible enough to enable the edges 70 and 80 to be pulled apart and resilient to enable return of edges 70, 80 into the original position.

Accordingly, the sanitary cover 60 is provided with the gripping means 30 described above for firmly securing the tubular member 70 onto the elongated handle 2.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A sanitary shield for preventing direct contact of a user with an exterior surface of said elongated handle, said shield comprising:
    (a) a flexible sheet having each of a predetermined width, a predetermined length and a predetermined thickness, said flexible sheet manufactured from a predetermined material;
    (b) a tubular body provided by said flexible sheet so as to surround the exterior surface of the elongated handle; and
    (c) a gripping arrangement including:
        i. a first plurality of intermeshing tabs and notches formed through said predetermined thickness and disposed in series with each other on a first longitudinal edge of said flexible sheet,
        ii. a second plurality of intermeshing tabs and notches formed through said predetermined thickness and disposed in series with each other on a second longitudinal edge of said flexible sheet,
        iii. wherein each of said second plurality of tabs is aligned and operably interlocked with a respective one of said first plurality of notches and wherein each of said second plurality of notches disposed on said second longitudinal edge is aligned and operably interlocked with a respective one of said first plurality of tabs disposed on said first longitudinal edge when said tubular member is mounted onto the elongated handle, and
        iv. wherein a depth of each notch is smaller than a height of a respectively aligned and cooperating tab.

2. The sanitary shield, according to claim 1, wherein said predetermined material of said flexible sheet is a biologically impervious material.

3. The sanitary shield, according to claim 1, wherein said sanitary shield includes predetermined indicia securely or removably disposed on an exterior surface of said flexible sheet being secured about the elongated handle.

4. The sanitary shield, according to claim 3, wherein said predetermined indicia is at least one of a decal and a print.

5. The sanitary shield, according to claim 1, wherein said predetermined thickness of said flexible sheet is about 0.12 inches.

6. The sanitary shield according to claim 2, wherein said predetermined material being each of washable and biologically impervious to at least one of harmful bacteria and infectious agent.

7. An article of manufacture for covering an exterior surface of an elongated handle, said article of manufacture comprising:
    (a) a flexible sheet having each of a predetermined width, a predetermined length and a predetermined thickness, said flexible sheet manufactured from a predetermined material, said predetermined material of said flexible sheet being each of washable and biologically impervious to at least one of harmful bacteria and infectious agent;
    (b) a tubular body provided by said flexible sheet so as to surround the exterior surface of the elongated handle;
    (c) a first interposed plurality of tabs and notches provided along a first longitudinal side edge of said flexible sheet and formed in series with each other through said predetermined thickness thereof along an entire length of said first longitudinal side edge;
    (d) a second interposed plurality of tabs and notches provided along an opposed second longitudinal side edge of said flexible sheet and formed in series with each other through said predetermined thickness thereof along an entire length of said second longitudinal side edge;
    (e) wherein all of said second plurality of tabs aligned and operably interlocked with said first plurality of notches and wherein all of said second plurality of notches formed in said second longitudinal side edge aligned and operably interlocked with said first plurality of tabs formed in said first longitudinal side edge when said article of manufacture is wrapped around the elongated handle; and
    (f) whereby a depth of each notch is smaller than a height of a respectively aligned and cooperating tab.

8. The article of manufacture, according to claim 7, wherein said predetermined material is a polyethylene chloride.

9. The article of manufacture, according to claim 7, wherein said predetermined thickness of said flexible sheet is about 0.12 inches.

10. The sanitary shield according to claim 1, wherein said predetermined material being each of washable and biologically impervious to at least one of harmful bacteria and infectious agent.

11. The sanitary shield, according to claim 1, wherein said predetermined material is a biologically impervious material.

12. The sanitary shield, according to claim 1, wherein each of said notches and tabs is composed of generally right angles.

13. The sanitary shield of claim 1, wherein each of said first and second plurality of intermeshing tabs and notches is disposed in series with each other on a respective longitudinal edge of said flexible sheet along said entire predetermined length thereof.

* * * * *